United States Patent [19]
Liu et al.

[11] Patent Number: 5,854,478
[45] Date of Patent: Dec. 29, 1998

[54] METHOD AND APPARATUS FOR READING MACHINE-READABLE SYMBOLS HAVING SURFACE OR OPTICAL DISTORTIONS

[75] Inventors: Lingnan Liu, Mill Creek; Mark Y. Shimizu, Seattle; Lisa M. Vartanian, Kirkland, all of Wash.

[73] Assignee: Intermec IP Corp., Everett, Wash.

[21] Appl. No.: 731,274

[22] Filed: Oct. 11, 1996

[51] Int. Cl.$^6$ .................................................. G06K 7/10
[52] U.S. Cl. .......................................... 235/462; 235/463
[58] Field of Search ..................................... 235/462, 463

[56] References Cited

U.S. PATENT DOCUMENTS

| | | | |
|---|---|---|---|
| 3,211,470 | 10/1965 | Wilson | 283/18 |
| 4,687,942 | 8/1987 | Takagi et al. | 250/556 |
| 4,973,829 | 11/1990 | Ishida et al. | 235/462 |
| 4,988,852 | 1/1991 | Krishnan | 235/462 |
| 5,124,537 | 6/1992 | Chandler et al. | 235/462 |
| 5,155,343 | 10/1992 | Chandler et al. | 235/462 |
| 5,194,722 | 3/1993 | Mergenthaler et al. | 235/463 |
| 5,241,164 | 8/1993 | Pavlidis et al. | 235/462 |
| 5,243,655 | 9/1993 | Wang | 380/51 |
| 5,304,787 | 4/1994 | Wang | 235/462 |
| 5,319,181 | 6/1994 | Shellhammer et al. | 235/462 |
| 5,378,881 | 1/1995 | Adachi | 235/462 |
| 5,396,054 | 3/1995 | Krichever et al. | 235/462 |
| 5,444,231 | 8/1995 | Shellhammer et al. | 235/462 |
| 5,446,271 | 8/1995 | Cherry et al. | 235/462 |
| 5,487,115 | 1/1996 | Surka | 235/462 |
| 5,635,699 | 6/1997 | Cherry et al. | 235/462 |

FOREIGN PATENT DOCUMENTS 0 449 634  10/1991  European Pat. Off. .
0 450 878  10/1991  European Pat. Off. .

*Primary Examiner*—Anita Pellman Gross
*Assistant Examiner*—Drew A. Dunn
*Attorney, Agent, or Firm*—Seed and Berry LLP

[57] ABSTRACT

A method and apparatus for reading a distorted image of data collection symbol within a reader image generated and stored by a two-dimensional symbology reader begins by first locating a starting point in the distorted symbol image within the stored reader image. The method identifies edge contours of some or all of the bars and spaces in the symbol. The method then identifies one or more points within each of the identified edges. Thereafter, the method defines one or more sampling paths or lines that extend through the symbol, and through the points such that each line is constructed in a "connect-the-dot" fashion. The bars and spaces can then be sampled based on one or more of the defined lines, and the information in the symbol decoded from the sampled bars and spaces.

34 Claims, 5 Drawing Sheets

METHOD AND APPARATUS FOR READING MACHINE-READABLE SYMBOLS HAVING SURFACE OR OPTICAL DISTORTIONS

TECHNICAL FIELD

The present invention relates to a method of reading machine-readable symbols having surface distortions or whose images are distorted when stored within a memory in a symbol reader.

BACKGROUND OF THE INVENTION

Bar code symbologies are widely used for data collection. The first bar code symbologies developed, such as U.P.C., EAN, Code 39 and Code 93 can be referred to as "linear" symbologies because data in a given symbol is decoded along one direction or axis. Linear symbologies generally encode data characters as parallel arrangements of multiple width rectangular bars and spaces. Each unique pattern of bars and spaces within a predetermined width defines a particular data character. A given linear symbol encodes several data characters along its length as several groups of unique bar and space patterns.

Such linear symbologies are typically decoded using laser scanners or wand-based readers. In general, bar code readers scan a symbol and sample the scan line or lines to get a one-dimensional signal waveform and/or a sequence of distances between the bars and spaces in the symbol, and then analyze the waveform or distances to deduce the data encoded in the symbol. If the symbol had any surface distortion, so that it was convoluted or wrinkled in three dimensions, laser scanners would have difficulty reading such symbols.

As data collection markets grew, greater amounts of data were required to be encoded within a smaller area (i.e., greater "information density"). To increase the information density in bar code symbologies, "multi-row" or "stacked" symbologies were developed such as Code 49 and PDF417. Stacked symbologies generally employ several adjacent rows, each row having several characters defined by groups of multiple width bars and spaces.

Difficulties arose in attempting to read and decode these stacked symbologies. For example, a typical laser scanner must be precisely aligned with each row in a stacked symbol for it to scan and properly decode the groups of bars and spaces in each row. If the laser scanner is skewed so that its beam scans across several rows, the resulting scan data cannot be accurately decoded. Most stacked symbologies are size tolerant, i.e., the ratio of the widths of the bars is important, rather than the actual widths themselves. Therefore, the size of a stacked symbol can be compacted, for example, by diminishing the height and width of each row. When the height of a stacked symbol is compacted, accurate scanning of each row becomes even more difficult because a laser scanner must be more precisely aligned with each row; otherwise, scan lines will cross through several rows.

U.S. Pat. No. 5,243,655 (the '655 patent) describes a system for decoding bar code symbols, particularly PDF417 symbols. The system employs a typical laser scanner that converts the image of a stacked bar code symbol into a series of scan lines, stored in a memory, that could be skewed with respect to the rows of the symbol. The decoder deconstructs each scan line into a vector of code word values corresponding to the code words in the stacked bar code symbol. The decoder assigns a row number to each of the code word values, and then fills in a matrix with the code words. After the matrix has been filled in, the decoder converts the code word values into data for use in required applications.

The reader under the '655 patent, however, requires significant processing time as the decoder fills in the matrix. Additionally, the method of decoding a stacked bar code under the '655 patent is limited to use with a laser scanner. If the stacked bar code symbol is applied to a round or cylindrical object, such a laser scanner will have difficulty converting the image of the symbol into a series of scan lines that contains all of the data in the symbol.

As the result of such limitations of laser scanners, and to accommodate the increasing information-density in developing symbologies, such as the stacked symbologies, area or two-dimensional readers were created. U.S. Pat. No. 5,124,537 (the '537 patent) describes a bar code reader using virtual scan of a digital image memory to create the equivalent scanning pattern of a mechanical laser scanner. A two-dimensional image of a bar code symbol at any random orientation is captured in the image memory. A microprocessor in the reader scans the image memory to create a virtual scan equivalent to the scan pattern of a laser scanner. Alternatively, the image memory is divided into a plurality of memory segments, and virtual scan is provided simultaneously in each of the respective memory segments.

The reader under the '537 patent, however, also requires significant processing time as each virtual scan is performed on the image memory as the system locates and decodes a bar code symbol captured somewhere in the memory. The reader described in the '537 patent is apparently limited to decoding linear bar code symbols. Additionally, while the reader under the '537 patent may more readily obtain all the information in a symbol that is applied to a curved surface, the reader will have difficulty decoding the symbol using virtual scan lines.

U.S. Pat. No. 5,155,343 (the '343 patent) describes an area reader that apparently improves over the method described in the '537 patent. The reader described in the '343 patent includes an image capture means for storing a two-dimensional image of the reader's field of view. The captured image may contain a bar code symbol. Once the image is captured in memory, a software method locates the bar code symbol within the stored image and provides a coarse orientation of the symbol. After the image of the bar code symbol is located, and its course orientation determined, the software method determines a fine orientation of the symbol. Thereafter, the method filters, scans and decodes the bar code symbol.

The systems described in the above patents require the area reader to be positioned substantially perpendicular to a flat surface containing a symbol to be read when the image of the symbol is captured in the image memory. Assuming that the symbol to be read has an overall rectangular shape, the image of the symbol within the image memory would similarly be rectangular. However, if the symbol is applied to a substrate that is not flat, and/or if the reader is not held perpendicular to the symbol, the image of the symbol in the image memory will be distorted. For example, if the substrate is not flat, but tilted with respect to the reader, the resultant image will look approximately trapezoidal.

The image of the symbol in the image memory will be further distorted if the symbol is placed on a distorted or wrinkled surface, rather than a flat surface. When a symbol or label is placed on a distorted or non-flat surface, a CCD or other two-dimensional reader will generate a two-dimensional image of the symbol where its distortions extend in three dimensions. Prior methods find a sampling path through the stored image of a symbol by first locating a change in intensity in the image to locate a boundary between a bar and a space in the symbol. From this change in intensity, the reader determines a "gradient direction" which refers to the direction of greatest change in pixel intensity from a given pixel in an image with respect to the edge direction of the bar or space at that pixel. The gradient direction thus defines a sampling path, ideally, through the image of the symbol. Another commonly and previously used method is to find an edge segment of a bar or space, then use the direction perpendicular to that line as the sample path direction. However, if the stored image of the symbol has perspective angle distortion, or other optical distortions, such as if the symbol has surface distortions, the sampling path based on the gradient direction could well begin within the symbol, but extend outside of the symbol as the sampling path extends along the gradient direction. For example, if the stored image of the symbol were angled or bent downwardly from left to right, and the gradient direction were established at a leftmost bar of the image, the sampling path would extend therefrom along a path that would eventually be positioned above the symbol, thereby missing the bars and spaces in a right-hand portion of the image.

SUMMARY OF THE INVENTION

According to principles of the present invention, a method of reading a distorted image of a symbol or other machine-readable visual indicia within a reader image generated and stored by a symbology reader is disclosed. The symbol, in its undistorted form, has an array of information bearing indicia as shapes or substantially parallel rectangular bars, and spaces between the bars, that encode data. The bars and spaces are arranged along at least one axis.

The method includes the steps of: (a) locating a bar or space of the image of the machine-readable symbol; (b) identifying an edge of the bar or space; (c) repeating the steps of locating a bar or space and identifying an edge until several edges have been identified and no more of such edges are identified in both forward and reverse directions; (d) selecting at least one point on each edge; (e) defining a path extending between each corresponding point of each edge; (f) sampling the bars and spaces along the path; and (g) decoding the data in the machine-readable symbol based on the sampled bars and spaces along the path.

The present invention solves problems inherent in the prior art by providing a method of compensating for optically distorted images of symbols stored in an image memory of a symbol reader. The present invention identifies edges or contours of bars and spaces in a stored image of a symbol. The "contour" of a bar or space, as generally used herein, can be a line or curve extending through the approximate center of a bar or space, or a line or curve forming the boundary between a bar and space. From there, the present invention constructs patch areas from these curves over the surface of the symbol. Each area has four curved sides, in general, but the area can, at times, be approximated as a quadrilateral. A sampling path can then be constructed through each curve that is not an edge contour, defined by a series of adjacent segments, where the paths extend through the entire stored image of the symbol. While each edge contour defining the boundary between bars and spaces is curved, the curve extending through each bar or space as a portion of the sampling path is typically straight within a given bar or space. Other features and advantages of the present invention will become apparent from studying the following detailed description of a presently preferred embodiment, together with the following drawings.

DETAILED DESCRIPTION OF THE INVENTION

A machine vision system, and in particular, an apparatus and method for locating and decoding data collection symbols or other machine-readable images, is described in detail herein. In the following description, numerous specific details are set forth such as specific linear or stacked symbols, order and method of identifying edges or portions of elements in such symbols, etc., in order to provide a thorough understanding of the present invention. One skilled in the relevant art, however, will readily recognize that the present invention can be practiced without the specific details, or with other symbols, locating routines, etc. In other instances, well-known structures are not shown in detail in order to avoid obscuring the present invention.

Figure 1:
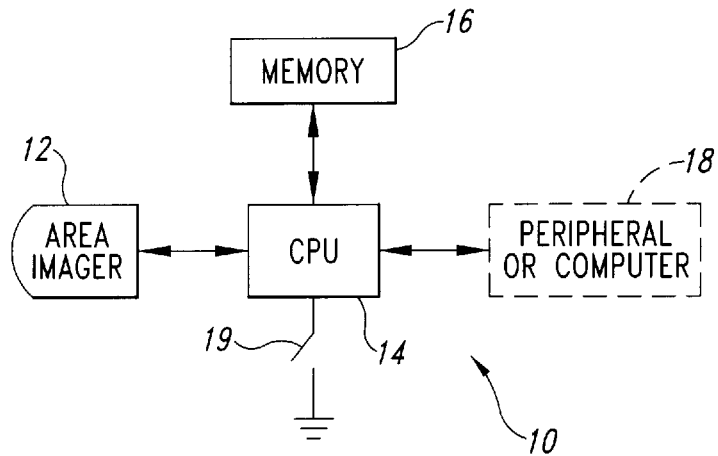
FIG. 1 is a block diagram of a data collection symbology reader of the present invention.

As shown in FIG. 1, a data collection symbology reader 10 of the present invention includes an area imager 12. As used herein, a "data collection symbol" refers to a symbol from any of the linear, stacked, area and other machine readable symbologies. An "area" symbology, such as Data Matrix or Code One, employs a matrix of data cells rather than one or more rows of bars and spaces. The height and width of each data cell within the matrix are generally equal, and the height and width of the symbol are generally comparable.

The area imager 12 contains an array of photosensitive elements, preferably a charge-coupled device ("CCD") having, for example, a rectangular active surface of 582×752 pixel elements. Other known area imagers may be used, such as vidicons, two-dimensional semiconductor arrays or a linear CCD array having mechanical means to pivot the array and provide resolution in an axis perpendicular to the linear axis of the CCD array. Additionally, other sized CCD arrays may be used, for example, circular or square CCD arrays. The 582×752 pixel element array defines the field of view of the area imager 12. Appropriate conventional focusing optics, electronics and/or a light source (not shown) are also provided as part of the area imager 12.

As is known, each pixel element in the CCD array of the area imager 12 outputs a gray level signal, i.e., an analog signal that determines the amount or intensity of light impinging upon the particular pixel element. Alternatively, each pixel element in the CCD array of the area imager 12 can output a signal that indicates the gray intensity value of the particular pixel element. The signals output from the CCD array are similar to video data.

A central processing unit ("CPU") 14 receives the video data signals output from the area imager 12. The CPU 14 preferably includes an analog-to-digital converter that converts the gray level analog signals from the area imager 12 into digital signals. The CPU 14 also preferably includes a clock operating at a high speed so that the CPU similarly operates at a rapid rate.

A memory 16, coupled to the CPU 14, stores the digital signals output from the CPU. The memory 16 preferably includes both volatile and non-volatile memory (e.g, random access and electronically erasable read only memory). An object or image within the field of view of the area imager 12 is converted into electrical signals that are digitized and stored in the memory 16 to be retrieved and processed by the CPU 14 under the routine described below. After processing the stored image, the CPU 14 can output to a peripheral apparatus or computer 18 the results of such processing. The reader 10 may be a hand-held product and include a trigger switch 19 coupled to the CPU 14. By actuating the trigger switch 19, the CPU 14 causes the area imager 12 to provide image signals to the CPU that constitute the instantaneous image within the field of view of the area imager. The specific means and method for storing an image of a symbol by the symbology reader 10 are conventional and will be understood by those skilled in the relevant art without need for further description herein.

Figure 2:
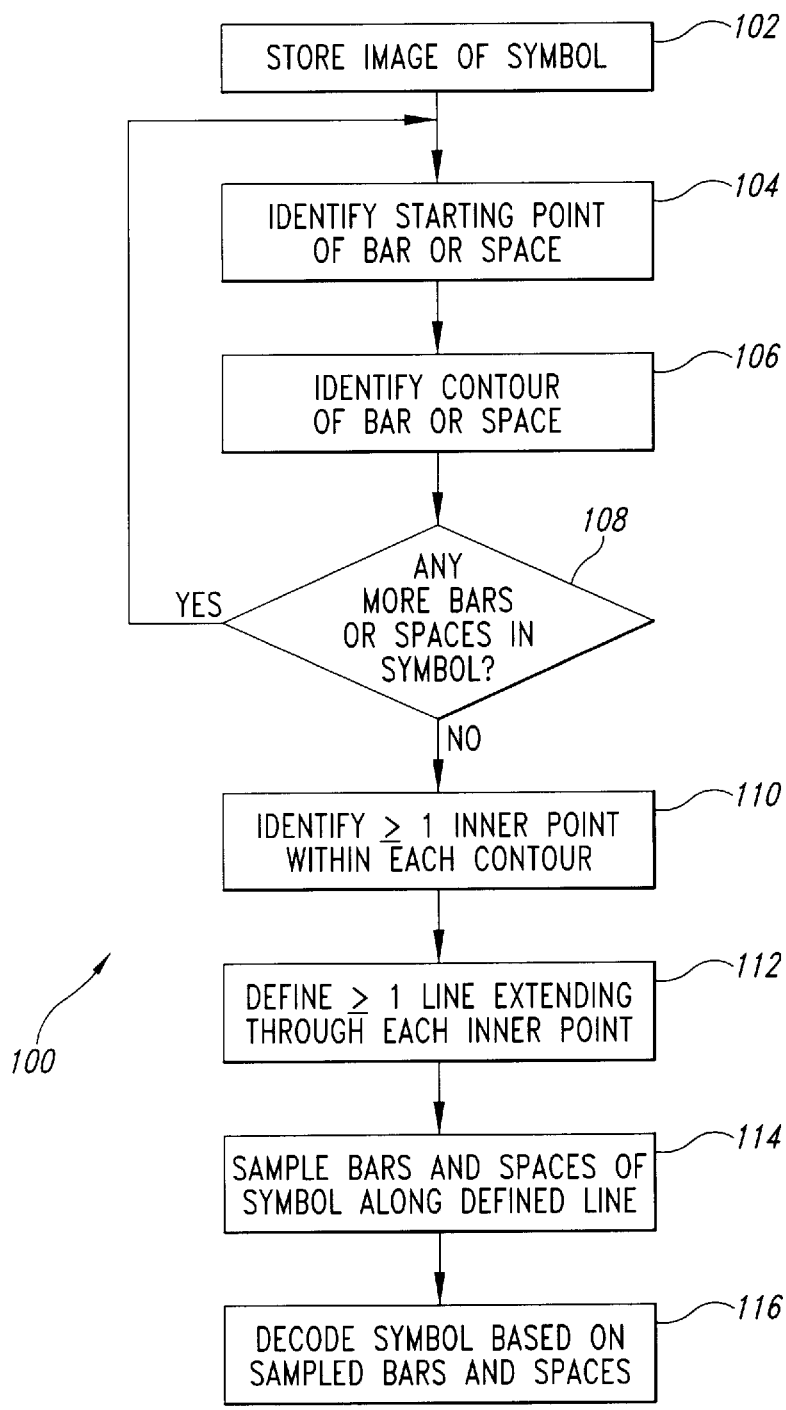
FIG. 2 is a flowchart of a basic method for locating and decoding a distorted image of a symbol stored by the symbology reader of FIG. 1.

Referring to FIG. 2, a routine 100, executed by the CPU 14, locates and decodes an image of a data collection symbol within the memory 16 of the symbology reader 10. The routine 100, and all the routines and methods described herein, are permanently stored within the non-volatile memory portion of the memory 16. The present invention operates on the pixel representation of the captured image stored in the memory 16 to determine the location and compensate for distortion, if any, of a symbol so that the symbol may be readily decoded.

The routine 100 begins in step 102, where the CPU 14 stores an image of a symbol. In step 102, the CPU 14 locates or identifies a starting point of a symbol within the stored image. As used herein, the term "stored image" generally refers to the overall image of the field of view stored in memory 16 that has been produced by the area imager 12 and the CPU 14, and which contains the symbol or symbols to be read (e.g., FIGS. 3 and 6).

Figure 3:
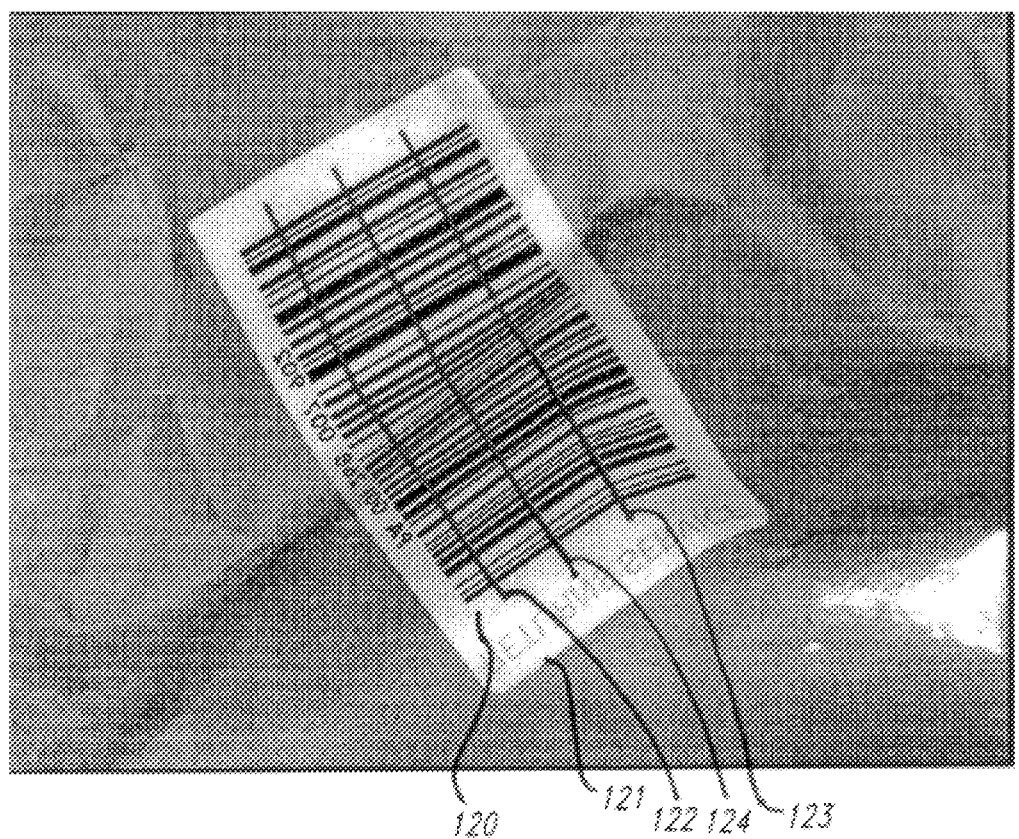
FIG. 3 is a computer scanned image showing a distorted image of a linear symbol stored by the symbology reader of FIG. 1, having surface distortions.

FIG. 3 shows an example of a distorted stored image of a linear symbol 120 stored within the memory 16. The symbol 120 is formed on a label 121, which is affixed to a wrinkled or contoured surface (i.e., a surface that is not planar). As a result, the symbol 120 is distorted in three dimensions, as it follows the contours of the underlying surface.

The stored image of the symbol 120 shown in FIG. 3 thus is a two-dimensional projection of the symbol 120 that extends in three dimensions. The problem of finding a correct path is to find a three-dimensional surface curve passing through the bars and spaces on the three-dimensional label orthogonally. In its two-dimensional projection, such orthogonality may not be preserved. The three-dimensional surface curve is generally projected into a two-dimensional curve. In bar code reading, a conventional image based reader samples a path through the label 120 in a direction that is perpendicular to the bars and spaces in two-dimensional images. Such a conventional method works well when the symbol 120 is on a planar surface, with little perspective angle changes in the field of view from a perpendicular position above the symbol. Generally, however, such a conventional method can be inaccurate because it is based on an intensity surface model of the symbol, and such a model is not a good model for a symbol distorted in three dimensions.

The present invention under the routine 100 employs a more accurate geometric three-dimensional surface model for the symbol 120. The routine 100 constructs one or more sampling paths through the symbol 120, based on a three-dimensional model. Such a three-dimensional model, as described in detail below, can accurately compensate for many three-dimensional distortions of the symbol 120, to provide either a more complete sampling path through the symbol, or two or more paths that, when combined, provide the information encoded in the symbol. For example, as explained in more detail below, the routine 100 determines sampling paths 122, 123 and 124 as shown in FIG. 3.

In the three-dimensional geometric model, the label is generally a three-dimensional surface with every boundary or edge between bars and spaces being a surface curve. The sampling paths with this surface model are the three-dimensional surface curves orthogonal to the set of bar/space boundary curves (perpendicular at intersection points). In many cases, the two sets of surface curves (i.e., the bar/space boundaries and the sampling paths) form geodesics of the label surface. The present invention uses the projections of the set of surface boundaries between the spaces/bars to estimate the projections of its orthogonal set of curves or sampling paths. By sampling along the projection curves, more accurate results can be achieved.

In order to estimate the sample path accurately, the present invention approximates the label surface with quadrilateral areas or surface patches. The two-dimensional projection of a surface patch positioned in three dimensions is a quadrilateral or trapezoid. Each patch has two boundaries formed by portions of the two approximated sampling paths, and two boundaries formed by bar-space boundaries on opposite sides of a given element (bar or space). The sides of the quadrilaterals are projections of the corresponding surface patch. The size or area of such patches in three dimensions that form the bars and spaces, and therefore, their two-dimensional projected quadrilaterals, depends on the degree of non-planarness of the symbol surface in three-dimensions. By first locating the bar/space boundaries and then correctly locating the connecting sides of each quadrilateral corresponding to the sample path in three-dimensional space, a sample path is always complete and uniquely determined.

Referring back to FIG. 2, the memory 16 includes for processing efficiency a 582×752 array of memory locations addressed by the CPU 14 that correspond to and represent the 582×752 pixels in the field of view of the CCD array. The stored image is referenced by a Cartesian coordinate system so that the location of each pixel is represented by a pair of numbers indicating the horizontal and vertical position of the pixel in the stored image. For example, the first pixel in the top left corner of the stored image is assigned the Cartesian coordinates (0,0) while the bottom right-most pixel is assigned the coordinates (752,582). Therefore, objects within the stored image, i.e., areas or groups of pixels, lines/paths formed therethrough, etc., can be arithmetically determined using known geometric and trigonometric properties based on the coordinate system (e.g., by equations of lines, trapezoids, or other geometric or trigonometric equations used for representing planar objects). As used herein, the term "locates" refers to determining both the position and orientation of an object within the stored image. Importantly, however, the present invention can determine sampling paths through the distorted image of a symbol in an intrinsic way that is independent of the coordinates system employed by the reader 10.

In step 104, the CPU 14 determines the location of a symbol in the stored image using known techniques such as by using virtual scans of or several sampling paths through the image in the memory 16. The CPU 14, in step 104, locates at least one bar or space in the symbol 125. Alternatively, the CPU 14 can locate a "defined portion" of a symbol in a given symbology that is unique for that particular symbology. For example, with most linear symbols, the CPU 14 can locate an outer bar of start or stop patterns for the symbol, which are adjacent to quiet zones (blank spaces surrounding the symbol). While the routine 100 of the present invention is generally described herein as compensating for surface or optical distortions in images of linear symbols, those skilled in the relevant art will recognize, based on the description provided herein, that the present invention may be readily adapted to compensate for distortions in symbols of other data collection symbologies. Therefore, with PDF417 symbols, the CPU 14 can locate peripheral patterns common in all PDF417 symbols. (PDF417 symbols employ a stack of one-dimensional encoded data cells or bars bounded on two sides by peripheral start and/or stop patterns.)

Figure 4:
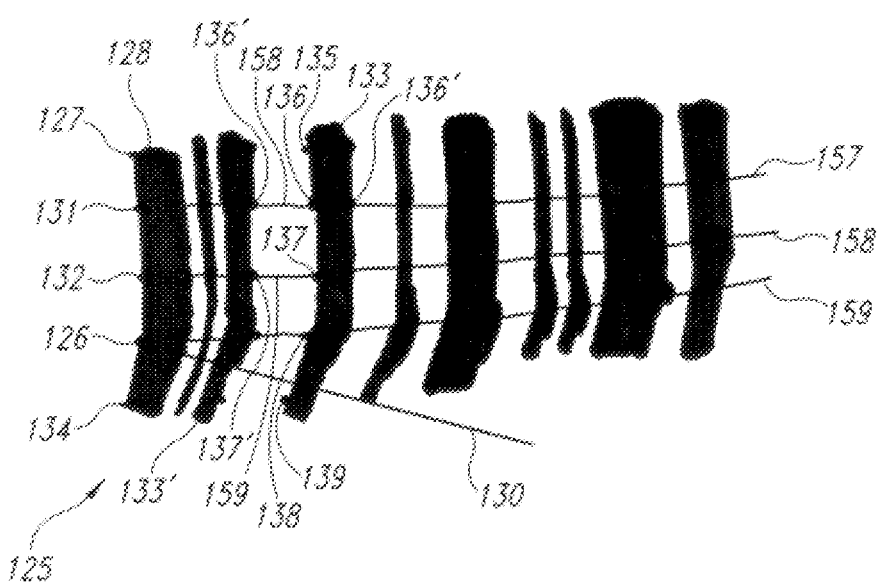
FIG. 4 shows an enlarged view of a portion of a distorted image of a linear symbol, having several sampling paths overlaid thereon.

During step 104, the CPU 14 also locates and stores in the memory 16 the Cartesian coordinates of a starting point of each symbol located in the stored image. The starting point is preferably a point along an edge between a bar or a space in the symbol, and can be a point along the edge of the outermost bar in the start or stop pattern for the symbol, adjacent to the quiet zone. As shown in FIG. 4, a starting point 126 is on an edge of an outermost bar 128, adjacent to the quiet zone. However, the starting point 126 can be located anywhere within the symbol 124, as will be appreciated from the discussion below.

In step 106, the CPU 14 examines pixel intensity transitions to identify or track the contour or edge boundary of the bar, space or defined portion that is adjacent to the starting point 126. In an example shown in FIG. 5, the CPU 14 tracks the left outer longitudinal edge boundary of the bar 126 for the symbol 125. As used herein. the term "tracking" generally refers to sequentially examining pixels in the stored image along and proximate to a selected path for pixels having similar intensities (i.e., perpendicular to the gradient direction). For example, in step 106, the CPU 14 begins to track the left edge of the bar 128 for the symbol 125 in the stored image if a top left corner point 127 were identified as the starting point in step 104. The result of the tracking is a contour of connected edge points between the bar and space.

Figure 5:
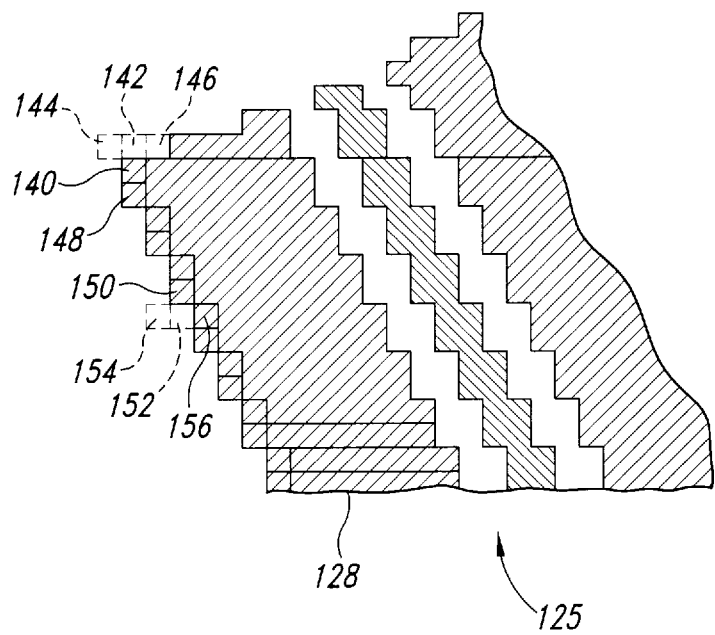
FIG. 5 shows an enlargement of a skewed portion of the symbol of FIG. 4.

Referring to FIG. 5, the top left corner point 127 of the symbol 125 in the stored image of FIG. 4 is shown enlarged as a pixel 140. The CPU 14 first samples pixels upwards from the pixel 140 and recognizes that the pixel 140 is in fact, the corner point for the bar 128. To insure that the pixel 140 is the corner, the CPU 14 examines a pixel 142 directly above the pixel 140 and those pixels to the left and right of the pixel 140 above (i.e., pixels 144 and 146). If pixels 142, 144 and 146 are white, then the CPU 14 is satisfied that the pixel 140 is the top-left point 127 of the bar 128. The CPU 14 then continues to examine pixels downward below the pixel 140 (i.e., pixel 148) as the CPU tracks for the next black pixel in a downward direction. Alternatively, if the pixel 142 was found by the CPU 14 to be black, but the pixel 144 was found to be white, the CPU 14 would continue to track upward from the pixel 142. After detecting the top left corner point 127 by detecting three consecutive white pixels above a given black pixel (i.e., pixels 142, 144 and 146), the CPU 14 would then continue to downwardly track the edge of the symbol 125, defining the entire length of the left edge of the bar 128.

Since the symbol 125 may be badly skewed within the stored image, as illustrated in FIG. 5, the CPU 14 not only checks the pixels directly below a given pixel, but also to the left and right of that pixel as it searches for the edge of the bar 128. For example, after the CPU 14 tracks down the edge of the symbol 125 to a pixel 150, the CPU tracks the next pixel 152 below the pixel 150. Since the symbol 125 is shown in FIG. 5 as being badly skewed, the CPU 14 determines that the pixel 152 is white. Therefore, the CPU 14 checks a pixel 154 to the left and a pixel 156 to the right of the pixel 152. The pixel 156 is black, and thus the CPU 14 continues tracking downward therefrom, continuing to track the left edge of the bar 128.

While the CPU 14 is described above as examining whether pixels along the edges of bars/spaces in the symbol 125 are white or black, the pixels may instead have a grey value. If a given examined pixel has a grey value, the CPU 14 in step 106 continues to examine pixels as explained above until a white pixel is found, and then the CPU continues tracking downward therefrom, as the CPU tracks the edge of the bar. The CPU 14 stores the coordinates of the pixels along the tracked edge in the memory 16.

Importantly, the CPU 14 preferably stores the coordinates of opposite endpoints of each edge tracked under step 106. By identifying the edge points of the edge, the CPU 14 can determine a length of the edge using the known distance formula, or other techniques. Alternatively, the CPU 14 can determine the length of the edge more accurately by actually measuring or counting the number of pixels along the edge. As explained more fully below, a length of each edge can be used to determine inner points along the edge.

Once the CPU 14 tracks the left edge for the bar 128, and if the bar were the outermost bar for the start or stop pattern for the symbol 125, the CPU could decode the symbol if the symbol were undistorted. The CPU 14 would sequentially sample the transition of the bars and spaces in an undistorted symbol image along a linear sampling path that runs rightward perpendicular to the edge of the start or stop bar of the symbol. Such a sampling path would be, ideally, aligned with the bars and spaces of the undistorted symbol image.

The symbol 125 in FIG. 4, however, like the symbol 120 in FIG. 3, is distorted, and thus standard linear sampling paths perpendicular to the start or stop bars could fail to decode all of the information within the symbol. For example, if a sampling path 130 were extended perpendicular to the starting point 126 in the outer edge of the bar 128, the path would extend only through the first few left-most bars in the symbol 125.

Therefore, under step 108 of FIG. 2, the CPU 14 determines whether more bars or spaces exist within the symbol 125. If so, then the CPU 14 loops back and performs steps 104, 106, and 108 until the longitudinal edges of all bars and spaces in the symbol 125 have been identified. If the starting point first identified in step 104 is within the middle of the symbol 125, then the CPU 14 moves first in one direction (e.g., rightward) to locate or identify the longitudinal edges of all bars and spaces rightward from the starting point, and then continues leftward from the starting point to locate all of the edges of the remaining bars and spaces in the symbol. While the edges shown for the symbol 120 in FIG. 3 are substantially linear, such edges, when enlarged, will more likely form curves or contours, such as shown by the enlarged portion of the symbol 125 in FIG. 4.

The CPU 14 in step 108 can determine whether more bars and spaces exist within the symbol 125 by analyzing one or more of the sampling paths through the stored image that were generated under step 104. The CPU 14 can analyze such sampling paths for areas in the stored region having numerous intensity transitions, which typically correspond to transitions between bars and spaces in a symbol. Quiet zones surrounding the symbol will typically produce a continuous area of substantially similar intensity.

Alternatively, in step 108, the CPU 14 can continuously move in the gradient direction of the first identified line and sample a neighborhood in such direction, until all edges have been located. Thereafter, the CPU 14 can search in the opposite gradient direction to locate all edges in the opposite direction. In general, the CPU 14 can locate edges from starting points under step 104 by analyzing a neighborhood, such as a 3×3 pixel area, for such edges. Such searching is well known in the art and described, for example, in A. Rosenfeld and A. Kak, *Digital Picture Processing*, Academic Press, Vols. 1 & 2, 1982.

Rather than locating every bar/space edge in the symbol 125, a CPU under the routine 100 can instead locate only some of the bar/space edges. For example, the CPU 14 in step 108 can jump a fixed distance to a new point, and then search in a neighborhood of the new point for a bar/space edge. This process can continue until edges at somewhat regular intervals are located within the symbol 125. By not locating every bar/space edge in the symbol 125, the symbol can be processed more rapidly under the routine 100. Additionally, such alternative processing of the symbol 125 under the routine 100 can be particularly valuable with symbols suffering from less severe distortions.

In step 110, the CPU 14 identifies at least one point within the length of each identified edge. For example, if the symbol 125 were relatively undistorted, the CPU 14 in step 110 would locate a midpoint for each identified edge. Then, in step 112, the CPU 14 would define a single sampling path extending through each midpoint. Thereafter, in steps 114 and 116, the CPU 14 would sample the bars and spaces of the symbol 125 along the defined sampling path and then decode the symbol based on the sampled bars and spaces.

However, since the symbol 125 is distorted, the CPU 14 in step 110 identifies several points along each identified edge. Alternatively, the CPU 14 can identify inner points while the CPU identifies the edge of a given bar, rather than after all of the edges have been located. The CPU 14 preferably locates each of these "inner points" at regular distances along each identified edge, such as points 127, 131, 132, 126, and 134 along the left edge of the bar 128, and points 135, 136, 137, 138, and 139 along the left edge of a bar 133. The number of inner points selected along every edge contour is the same throughout the barcode 125. The worse that the surface distortion is, the more inner points that are needed to handle the surface non-planarness of the original symbol. The locations of inner points are determined so that their distance to an endpoint of the bar/space or tracked edge is preferably a certain percentage of the total length of the bar/space or edge. Alternatively, the number of inner points can be dependent on a certain percentage of the total distance between the endpoints along the distance of the edge. (Often, the edge will be curved, so that its length is greater than the length of a line extending between the two endpoints of the edge.) Similar points are regularly identified for each of the left and right edges of the other bars in the symbol 125. The number of inner points located along each edge can be selected based on such factors as the X-dimension of the symbol, the height or longitudinal length of each edge, etc. A minimum of about three of such inner points should be located, while a maximum number can depend upon an amount of distortion to which the symbol is subject, the processing power of the CPU 14, etc. In general, a greater number of selected inner points produces more accuracy under the present invention.

In step 112, the CPU 14 defines several sampling paths through the symbol 125. The CPU 14 in step 112 first defines line segments between pairs of inner points, where each line segment passes through a bar or space in the symbol. For example, the CPU 14 in the example of FIG. 4 defines a line segment 158 between a point 136' at the rightward edge of the bar 133' and the point 136 on the leftward edge of the bar 133, where the line segment passes through the space positioned therebetween. Likewise, the CPU defines a line segment 159 between a point 137' at the rightward edge of the bar 133' and the point 137 at the leftward edge of the bar 133. Each line segment then is joined together to form a continuous sampling path or curve through the symbol 125, such as the sampling paths 157, 158 and 159.

In sum, the CPU 14 in step 112 defines or constructs each element in the symbol 135 as a series of planar patches, or quadrilateral regions. For example, the space formed between the bars 133 and 133' includes a quadrilateral region formed by the line segments 158 and 159, and the portions of the rightward and leftward edges of the bars formed between the points 136 and 137, and 136' and 137', respectively. In sum, each quadrilateral region has two opposite edges forming portions of each bar/space edge in the symbol 125, and two other opposite edges, or "path edges" that form portions of the paths 157–159 through the symbol 125. If the CPU 14 in step 110 selects inner points that include points at the upper and lower corners of each edge, such as points 127 and 134 for the leftward edge of the bar 128, then the CPU in step 112 can construct lines that define the upper and lower edges of the symbol 125. As a result, the CPU 14 in step 112 can, if necessary, determine with fair accuracy the area of each element in the symbol 125.

Thereafter, in step 114, the CPU 14 samples the bars and spaces in the symbol 125 along one or more sampling paths, such as the sampling paths 157 through 159. Importantly, a given symbol can have distortions in three dimensions such that portions of the two-dimensional image thereof lack some data. The symbol 120 of FIG. 3 has a diagonal distortion running through the middle of the symbol. By employing multiple sampling paths through the symbol, all of the data (i.e., all of the correct widths of all of the bars and spaces) can be sampled by the CPU 14. For example, the diagonal distortion runs generally upward and rightward as shown in FIG. 3. Therefore, the lower sampling path 122 can retrieve most of the correct widths of the bars and spaces from the top left portion of the symbol up to the distortion, while the upper sampling path 123 can recover the remaining widths of the bars and spaces from the distortion downward and rightward. Thereafter, in step 116, the CPU 14 decodes the symbol 120 (or 125) based on the sample widths of the bars and spaces.

The problem of finding a corresponding sample path portion along different sample paths is easily solved by either moving along tracked edges or by shifting or jumping to locations of the sides of the quadrilaterals. For example, after sampling along a first portion of the lower sampling path 122 to an inner point on an inner edge of the symbol 125, the CPU 14 moves upward along the inner edge to the upper sampling path 23, at which time the CPU continues to sample a remainder of the symbol along the upper sampling path. Alternatively, after having identified the various quadrilaterals in the symbol 125, the CPU 14 can jump to endpoints of each path edge of the quadrilaterals to move from one sampling path to another along a tracked edge.

Figure 6:
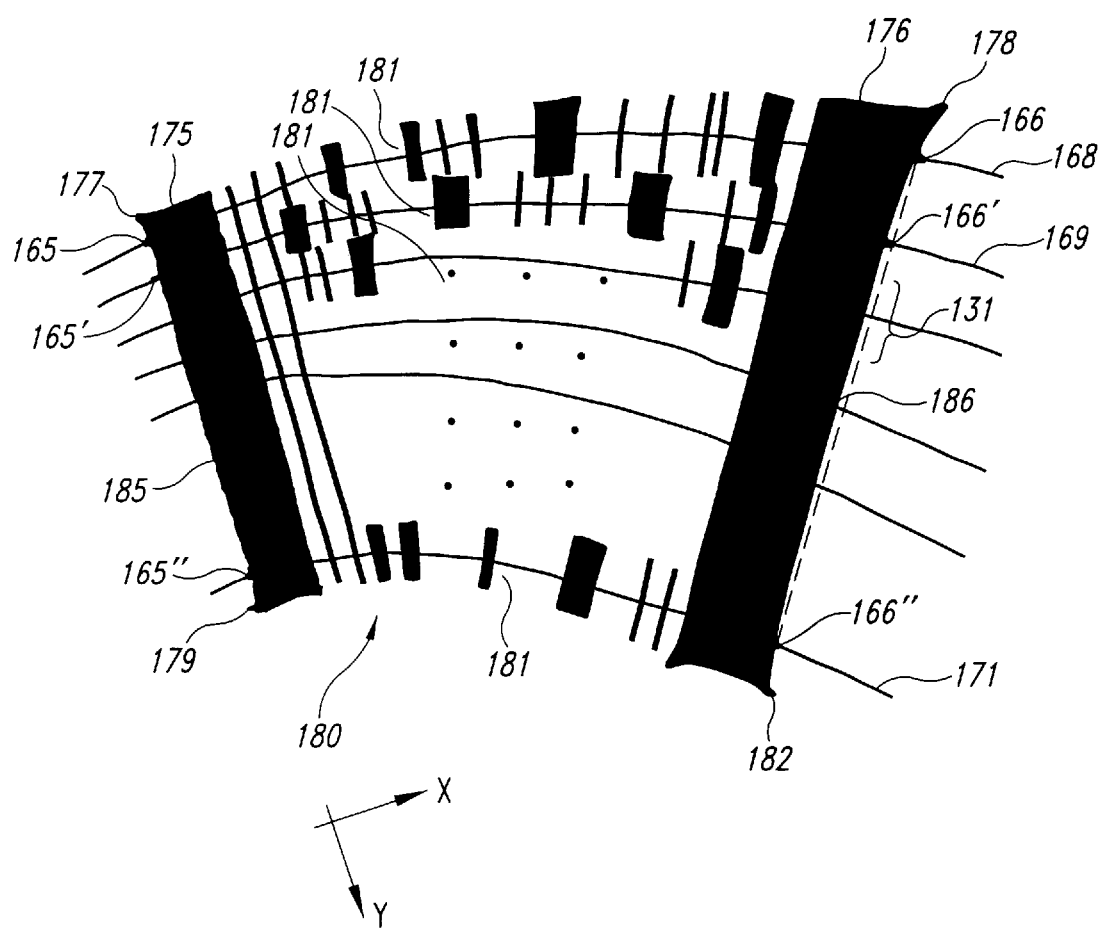
FIG. 6 shows a distorted image of a stacked symbol stored by the symbology reader of FIG. 1, having several sampling paths overlaid thereon.

As noted above, the routine 100 can allow the reader 10 to decode a wide variety of data collection symbols. Referring to FIG. 6, an alternative embodiment of the present invention will be described with respect to a stacked symbol. This alternative embodiment is substantially similar to the previously described embodiment, and only significant differences in the operation of the present invention will be described in detail below.

As shown in FIG. 6, a PDF417 symbol 180 has distortions that could be caused by a rectangular symbol fixed to a spherical surface or substrate. Since the symbol 125 is a PDF417 symbol, it includes multiple rows 131 of elements, and includes header information within the first two rows 121 that indicate the total number of rows within the symbol. Additionally, the first or last characters within the last row 131 of the symbol 180 indicate the number of rows within the symbol. Symbols from other symbologies similarly provide header characters or other methods to indicate the number of rows within the symbol. For example, the CPU 14 need only decode one row in a Code 49 symbol to determine the number of rows within that symbol.

Therefore, for the symbol 180, the CPU 14 in step 104 or 108 samples the first character in the top two rows 131, or the first or last character in the last row, and then decodes one or more of these characters to determine the number of rows within the symbol 180. As a result, the CPU 14 can determine more accurately if any additional bars/spaces exist in the symbol 180 in step 108, or as described below, determine how many inner points to identify in step 110. If the stored image of the symbol 180 is distorted, the initial sample of the first few characters within the rows 131 under step 104 will likely sample along a skewed line that cuts across two or more rows, or fails to obtain all the characters within a row. Nevertheless, the CPU 14 need only sample and decode the first or last character within the last row 131 of the symbol 180 to determine the number of rows within the symbol.

The CPU 14 in step 110 preferably selects each inner point to be at a position within the middle of the longitudinal length of each row 131. If the symbol 180 includes eight rows of data characters, then the CPU 14 selects eight inner points, including points 165, 165' and 165" on a leftward edge 185 of a start bar 175, and points 166, 166' and 166" along a rightmost edge 186 of a stop bar 176 in the symbol 180. For example, if a top left-most point 177 of the start bar 175 has the coordinates (40,20) while a bottom left-most point 179 has the coordinates (40,100), and the symbol 180 has eight rows of characters, then the CPU 14 selects inner points 165 through 165" along the left-most edge 185 at the points: (40,25), (40,35), (40,45), (40,55), (40,65), (40,75), (40,85), and (40,95).

Similarly, if top and bottom right-most points 178 and 182, respectively, of the stop bar 176 have the respective coordinates (180,10) and (160,120), the CPU 14 selects the following inner points: (178,15), (176,30), (174,45), (171, 60), (169,75), (166,90), (164,105), and (162,115). The CPU 14 similarly determines the coordinates of points between the elements in each row, at a midpoint along the longitudinal length of each element in the row. Thereafter, in step 112, the CPU 14 constructs eight sampling paths formed through a middle of each of the rows 181 in the symbol 180. In step 114, the CPU 14 samples each element in the rows 181, and attempts to decode the symbol 180 in step 116.

Alternatively, the CPU 14 in steps 114 and 116 can sample a row and attempt to decode it, before sampling the next row and decoding it. The data characters determined in step 116 can then be output to the peripheral or computer 18 (FIG. 1) if necessary for a particular application. If the CPU is unable to decode all characters within the symbol 180, with or without employing error correction characters in the symbol, the CPU can attempt to construct two or more sampling paths through each row 181 by selecting one or more inner points within each row.

If the symbol 125 is optically distorted to such an extent that the widths of the individual bars and spaces increase from left to right in a given row 131, the routine 100 may nevertheless decode each row of bars and spaces using known algorithms that decode each group of bar and space patterns that correspond to a data character. Distortions within a given character are generally much less than the distortions along an entire symbol or row. Therefore, most standard decode algorithms are able to compensate for varying widths of bars and spaces within a symbol or row by decoding each symbol or row on a character-by-character basis.

For example, the Factor R algorithm is a standard decode algorithm for Code 39 symbols where each set of five bars and spaces corresponds to one data character. Under the Factor R algorithm, each set of five bars and spaces is measured and adjusted for distortions within that particular character, thus decoding each symbol character by character. The Factor R algorithm compensates for acceleration distortions caused by manually scanning a Code 39 symbol by a scanning wand. The acceleration distortions caused by manually scanning a symbol are similar to the varying bar/space widths encountered by the present invention. Therefore, the Factor R decode algorithm is similarly used under the present invention to compensate for varying widths of individual bars and spaces along a given row 131. PDF417 and other symbologies similarly employ standard decode algorithms set forth in official publication standards for the given symbology. For PDF417 symbols, the decode algorithm compares the length of the leading edge of the first bar to the leading edge of the second bar, and the length of the trailing edge of the first bar to the trailing edge of the second bar for each character, and both lengths are compared to the total length for the given character to determine an amount of adjustment for any distortions in width.

Figure 7:
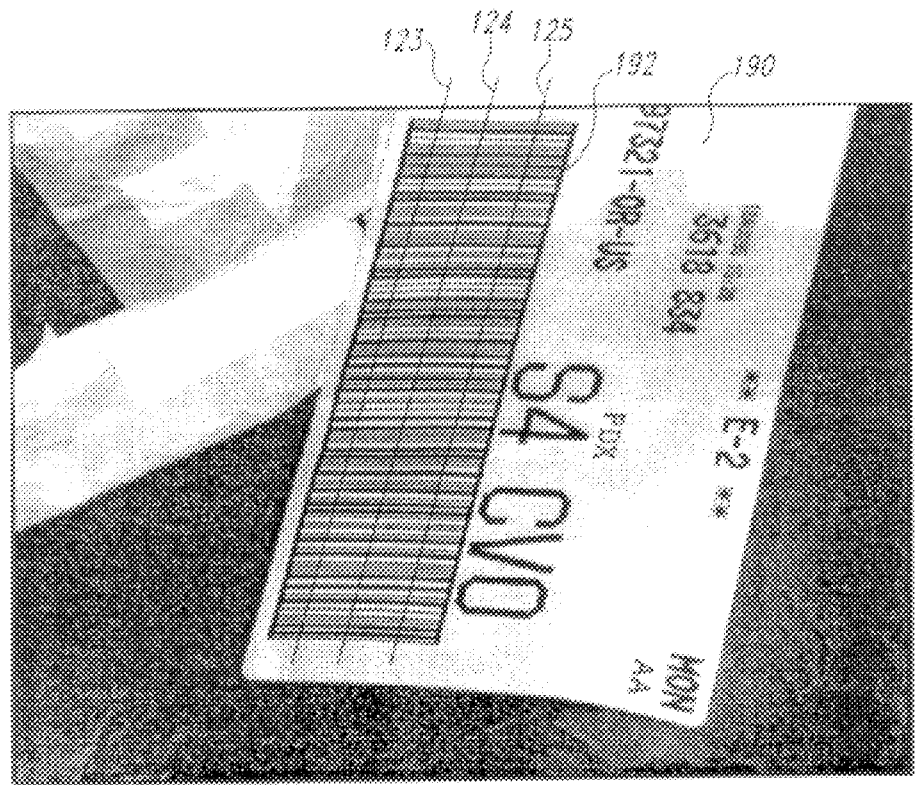
FIG. 7 is a computer scanned image of a linear symbol suffering from perspective angle distortion.
Figure 8:
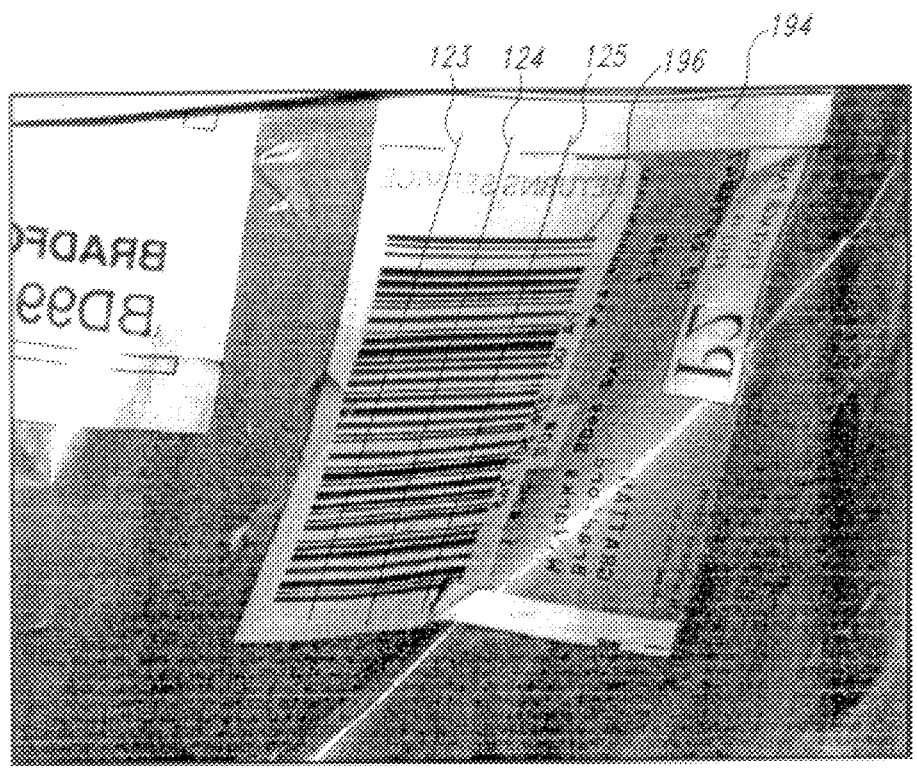
FIG. 8 is a computer scanned image of a linear symbol suffering from both perspective angle and surface distortions.

Referring to FIG. 7, a label 190 having a symbol 192 is shown within a stored image as produced by the reader 10. The symbol 192 has a perspective angle distortion. Nevertheless, the reader 10, under the routine 100, can produce the sampling paths 123–125 that extend substantially perpendicular to the bars and spaces of the symbol 192. FIG. 8 similarly shows a label 194 having a symbol 196. The symbol 196 has not only perspective distortions, but also contour distortions. Nevertheless, the reader 10 under the routine 100 can produce the sampling paths 123–125 through the symbol 196.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other machine vision systems, not necessarily the exemplary data collection symbology reader described above. The present invention can also be modified, if necessary, to employ the systems, methods and concepts of one of the co-inventors of copending U.S. application Ser. Nos. 08/607,100, filed Feb. 26, 1996, entitled "Method and Apparatus for Accurately Locating Data Regions in Stored Images of Symbols," and/or 08/654,925, filed May 29, 1996, entitled "Method and Apparatus for Locating and Decoding Machine-Readable Symbols, Including Data Matrix Symbols," all of which are incorporated herein by reference as if set forth in their entirety. Furthermore, while the present invention locates edges or curves between bars and spaces in an image of a symbol, and defines inner points along the edge, the present invention can similarly locate a line or curve extending through the approximate center of a bar or space, and then define inner points along such centrally extending curve.

These and other changes can be made to the invention in light of the above detailed description. In general, in the following claims, the terms used should not be construed to limit the invention to the specific embodiments disclosed in the specification and the claims, but should be construed to include all machine vision systems that operate in accordance with the claims to provide a method for accurately reading distorted visual indicia. Accordingly, the invention is not limited by the disclosure, but instead its scope is to be determined entirely by the following claims.

We claim:

1. A method of reading a distorted image of a data collection symbol stored within an image generated and stored by a symbol reader, the symbol in its undistorted form having an array of substantially parallel rectangular bars and spaces between the bars that encode data, the bars and spaces being arranged along at least one axis, the method comprising the steps of:

locating a bar or space of the distorted image of the data collection symbol;

identifying an edge of the bar or space;

repeating the steps of locating a bar or space and identifying an edge until at least some of the edges of the bars or spaces in the data collection symbol have been identified;

selecting at least one point on each identified edge;

defining at least one path extending between each corresponding point of each edge;

sampling the bars and spaces along the at least one path; and decoding the data in the data collection symbol based on the sampled bars and spaces along the at least one path.

2. The method of claim 1 wherein the step of selecting at least one point on each identified edge includes identifying at least first, second and third points on each edge, wherein the step of defining at least one path extending between each corresponding point of each edge includes defining a first path extending through each of the first points on each edge, defining a second path extending through each of the second points on each edge, and defining a third path extending through each of the third points on each edge, and wherein the step of decoding the data in the data collection symbol based on the sampled bars and spaces along the at least one path includes decoding the data in the data collection symbol based on a portion of the first path and a portion of the third path.

3. The method of claim 1 wherein the data collection symbol includes first and second rows of bars and spaces arranged along two parallel axes, wherein the step of selecting at least one point on each identified edge includes selecting at least one point on each identified edge of each bar in each row, and wherein the step of defining at least one path extending between each corresponding point of each edge defines at least first and second paths through the first and second rows.

4. The method of claim 1 wherein the step of locating a bar or space of the image of the data collection symbol includes identifying a starting point within the stored image.

5. The method of claim 1 wherein the step of selecting at least one point on each identified edge includes identifying at least first, second and third points on each edge, and wherein the step of defining at least one path extending between each corresponding point of each edge includes defining a first path extending through each of the first points on each edge, defining a second path extending through each of the second points on each edge, and defining a third path extending through each of the third points on each edge.

6. The method of claim 1, further comprising the steps of:

attempting to decode the data collection symbol based on the sampled bars and spaces along the at least one path;

selecting a plurality of points on each edge greater than a number of points previously selected under the step of selecting at least one point on each identified edge;

defining a plurality of paths extending between the plurality of points on each edge;

sampling the bars and spaces along the plurality of paths; and decoding the data in the data collection symbol based on the sampled bars and spaces along the plurality of paths.

7. The method of claim 1 wherein the data collection symbol includes a defined pattern, and wherein the step of locating a bar or space of the distorted image of the data collection symbol includes the step of locating the defined pattern of the data collection symbol.

8. The method of claim 1 wherein the step of repeating the steps of locating a bar or space include identifying an edge until all edges of the bars or spaces in the data collection symbol have been identified.

9. The method of claim 1 wherein the step of repeating the steps of locating a bar or space includes the steps of:

moving a fixed distance in a direction substantially perpendicular to the identified edge to a new point;

locating an edge of a bar or space in a neighborhood proximate to the new point; and repeating the steps of moving and locating an edge until edges of several bars or spaces in the data collection symbol have been identified.

10. The method of claim 1 wherein the step of identifying an edge of the bar or space includes the steps of:

identifying a starting edge point on each identified edge and sequentially identifying connecting points along the identified edge until opposite endpoints of each identified edge are located; and determining a distance between the opposite endpoints.

11. The method of claim 1 wherein the step of identifying an edge of the bar or space includes the steps of:

identifying a starting point within each bar or space and sequentially identifying connecting points within the bar or space until opposite endpoints of each bar or space are located; and determining a length of each bar or space based on a curve connecting the opposite endpoints.

12. The method of claim 1 wherein the step of selecting at least one point on each identified edge includes identifying at least first and second points on each edge, wherein the step of defining at least one path extending between each corresponding point of each edge includes the steps of:

defining a first path extending through each of the corresponding first points on each identified edge; and defining a second path extending through each of the corresponding second points on each identified edge, and wherein the step of decoding the data in the data collection symbol based on the sampled bars and spaces along the at least one path includes the steps of:

decoding the data in the data collection symbol based on a portion of the first path, the portion of the first path extending from a first end of the symbol to a first inner point;

moving along an inner edge of a bar or space in the symbol from the first inner point to a second inner point; and decoding the data in the data collection symbol based on a portion of the second path, the portion of the second path extending from the second inner point in the symbol to a second end of the symbol.

13. A method of sampling information of a distorted image of machine-readable visual indicia within a reader image generated and stored by an indicia reader, the machine-readable visual indicia in its undistorted form having a plurality of information bearing indicia extending and decodable along at least one axis, and the plurality of information bearing indicia having a plurality of edges between the information bearing indicia and areas formed therebetween, the method comprising the steps of:

identifying a starting point proximate to an information bearing indicia of the distorted image of the machine-readable visual indicia;

identifying at least some edges of the information bearing indicia based on the starting point;

selecting at least one point on each identified edge;

defining at least one path extending between each corresponding point of each edge; and sampling the information bearing indicia along the at least one path.

14. The method of claim 13 wherein the step of selecting at least one point on each identified edge includes identifying at least first, second and third points on each edge, wherein the step of defining at least one path extending between each corresponding point of each edge includes defining a first path extending through each of the first points on each edge, defining a second path extending through each of the second points on each edge, and defining a third path extending through each of the third points on each edge, and wherein the step of reading the machine-readable visual indicia based on the sampled information bearing indicia along the at least one path includes reading the machine-readable visual indicia based on a portion of the first path and a portion of the third path.

15. The method of claim 13 wherein the machine-readable visual indicia includes first and second rows of information bearing indicia arranged along two parallel axes, wherein the step of selecting at least one point on each identified edge includes selecting at least one point on each identified edge of each information bearing indicia in each row, and wherein the step of defining at least one path extending between each corresponding point of each edge defines at least first and second paths through the first and second rows.

16. The method of claim 13 wherein the step of identifying a starting point includes locating an information bearing indicia of the image of the machine-readable visual indicia.

17. The method of claim 13 wherein the step of selecting at least one point on each identified edge includes identifying at least first, second and third points on each edge, and wherein the step of defining at least one path extending between each corresponding point of each edge includes defining a first path extending through each of the first points on each edge, defining a second path extending through each of the second points on each edge, and defining a third path extending through each of the third points on each edge.

18. The method of claim 13, further comprising the steps of:

attempting to read the machine-readable visual indicia based on the sampled information bearing indicia along the at least one path;

selecting a plurality of points on each edge greater than a number of points previously selected under the step of selecting at least one point on each identified edge;

defining a plurality of paths extending between the plurality of points on each edge;

sampling the information bearing indicia along the plurality of paths; and reading the machine-readable visual indicia based on the sampled information bearing indicia along the plurality of paths.

19. The method of claim 13 wherein the machine-readable visual indicia includes a defined pattern, and wherein the step of identifying a starting point includes the step of locating the defined pattern of the machine-readable visual indicia.

20. The method of claim 13 wherein the machine-readable visual indicia is a bar code symbol, and wherein the step of reading the machine-readable visual indicia includes decoding the bar code symbol.

21. The method of claim 13, further comprising the step of reading the machine-readable visual indicia based on the sampled information bearing indicia along the at least one path.

22. The method of claim 13 wherein the step of identifying at least some edges of the information bearing indicia includes identifying all edges of the information bearing indicia.

23. The method of claim 13 wherein the step of identifying at least some edges of the information bearing indicia includes the steps of:

moving a selected distance in a direction along the at least one axis to a new point;

locating an edge of one of the information bearing indicia in a neighborhood proximate to the new point; and repeating the steps of moving and locating an edge until edges of several information bearing indicia have been identified.

24. The method of claim 13 wherein the step of selecting at least one point on each identified edge includes the steps of:

identifying endpoints of at least some of the identified edges; and determining a distance between the endpoints.

25. The method of claim 13 wherein the step of selecting at least one point on each identified edge includes identifying at least first and second points on each edge, wherein the step of defining at least one path extending between each corresponding point of each edge includes the steps of:

determining a first path extending through each of the corresponding first points on each identified edge; and defining a second path extending through each of the corresponding second points on each identified edge, and wherein the step of sampling the information bearing indicia along the at least one path includes the steps of:

sampling the information bearing indicia based on a portion of the first path, the portion of the first path extending from a first end of the machine-readable visual indicia to a first inner point;

moving along an inner edge of one of the visual indicia from the first inner point to a second inner point proximate to the inner edge; and sampling the information bearing indicia based on a portion of the second path, the portion of the second path extending from the second inner point to another point.

26. The method of claim 14 wherein the step of selecting at least one point on each identified edge includes the steps of:

identifying endpoints of at least some of the identified edges; and determining a length of the at least some of the identified edges between the endpoints.

27. A method of analyzing a distorted image of a data collection symbol stored within a two-dimensional image generated and stored by a symbol reader, the symbol in its undistorted form having an array of substantially parallel rectangular bars and spaces between the bars that encode data, the bars and spaces being arranged along at least one dimension, the symbol being distorted in three-dimensions, the method comprising the steps of:

locating a bar or space of the distorted two-dimensional image of the data collection symbol;

identifying an edge of the bar or space;

repeating the steps of locating a bar or space and identifying an edge until at least some of the edges of the bars and spaces in the data collection symbol have been identified;

selecting a plurality of points on each identified edge;

defining a plurality of segments extending between each corresponding point of each edge; and defining a plurality of planar areas for bar or space, each planar area defined by a pair of the plurality of segments and portions of adjacent identified edges.

28. The method of claim 26 wherein the step of defining a plurality of planar areas includes the step of determining an area of each bar or space in the data collection symbol based on the plurality of defined planar areas.

29. The method of claim 26 wherein the step of defining a plurality of segments includes defining a plurality of sampling paths, each sampling path including a plurality of linked segments extending along the at least one dimension.

30. The method of claim 26 wherein the step of repeating the steps of locating a bar or space includes identifying an edge until all edges of the bars or spaces in the data collection symbol have been identified.

31. An apparatus for decoding a machine-readable symbol representing encoded information, the symbol including an array of shapes and spaces between each shape that encode data, the shapes and spaces being arranged along at least one axis, the apparatus comprising:

an image sensor that receives light reflected from the symbol and that produces an output signal therefrom that represents a distorted image of the shapes and spaces comprising the symbol;

a storage device for storing the output signal of the distorted image of the shapes and spaces; and a processor for processing a stored signal and producing a signal indicative of the information encoded in the symbol, wherein a processor (a) identifies edges of the shapes in the symbol, (b) selects at least one point on each edge, (c) defines at least one path extending between each corresponding point of each edge, (d) samples the bars and spaces along the at least one path; and (e) decodes the data in the symbol based on the sampled bars and spaces along the at least one path.

32. A method of sampling information of a distorted image of machine-readable indicia within a reader image generated and stored by an indicia reader, the machine-readable visual indicia in its undistorted form having a plurality of information bearing indicia extending and decodable along at least one axis, the method comprising the steps of:

identifying a starting point proximate to an information bearing indicia of the distorted image of the machine-readable visual indicia;

identifying a curve extending through at least some of the information bearing indicia based on the starting point;

selecting at least one point on each identified curve;

defining at least one path extending between each corresponding point of each identified curve; and sampling the information bearing indicia along the at least one path.

33. The method of claim 32 wherein the step of selecting at least one point on each identified curve includes the steps of:

identifying a start point within an information bearing indicia and sequentially identifying connecting points along the identified curve until opposite endpoints of the identified curve are located; and determining a length of the identified curve extending between the opposite endpoints.

34. The method of claim 33 wherein the step of selecting at least one point on each identified curve includes the steps of:

identifying a start point within an information bearing indicia and sequentially identifying connecting points along the curve until opposite endpoints of the identified curve are located; and determining a distance between the opposite endpoints.

* * * * *